Figures 1, 2:
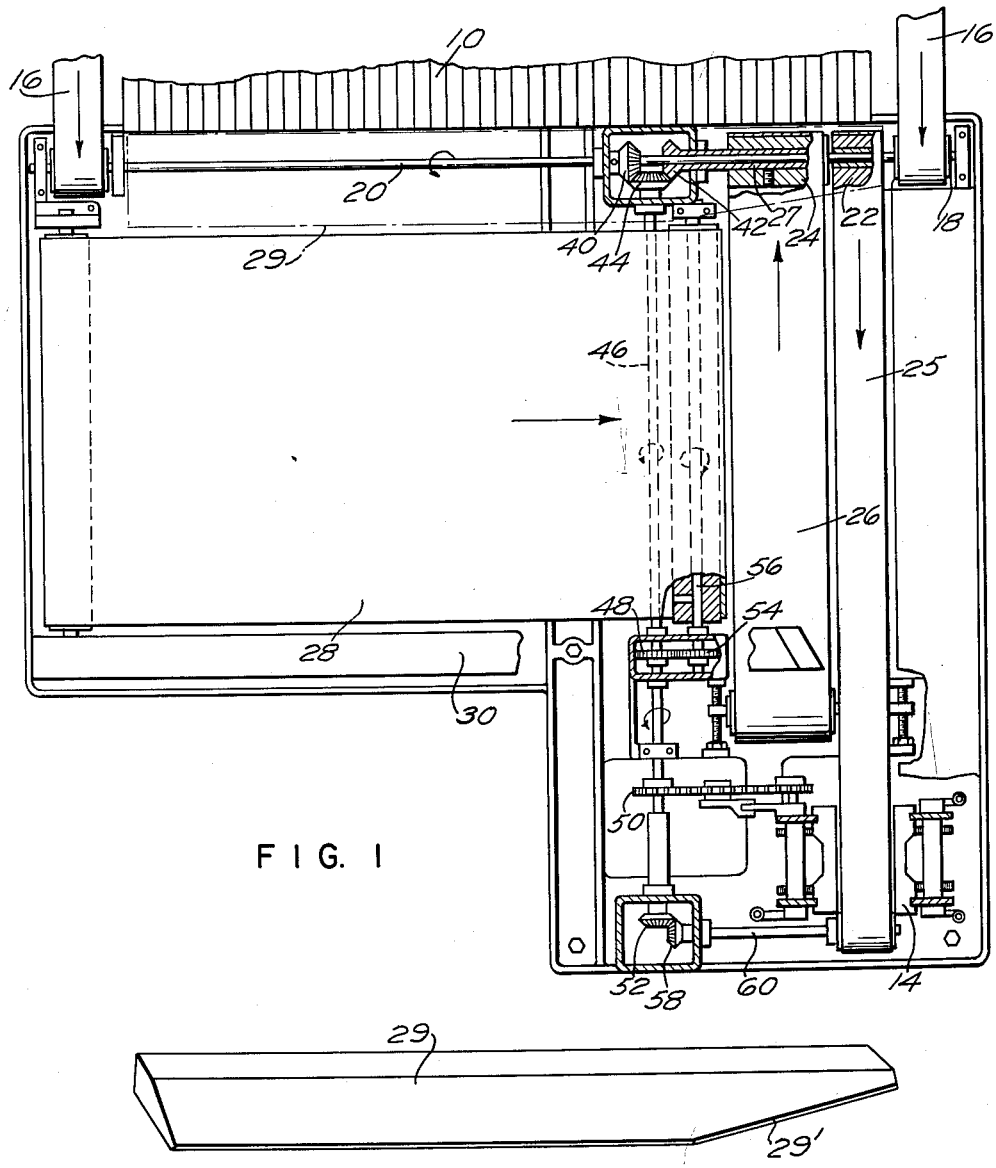

April 11, 1961     K. C. SHERMAN     2,979,332
CONVEYOR SYSTEM FOR THE PIT FLOOR OF BOWLING ALLEYS
Original Filed Aug. 2, 1955

INVENTOR.
KENNETH C. SHERMAN
BY Morse & Altman
ATTORNEYS

2,979,332
CONVEYOR SYSTEM FOR THE PIT FLOOR OF BOWLING ALLEYS

Kenneth C. Sherman, Glen Burnie, Md. (168 Beach Drive, Hillesmeres Shores, Annapolis, Md.)

Original application Aug. 2, 1955, Ser. No. 526,033, now Patent No. 2,920,891, dated Jan. 12, 1960. Divided and this application Jan. 7, 1960, Ser. No. 1,039

3 Claims. (Cl. 273—43)

This application is a division of my copending application Serial No. 526,033, filed August 2, 1955, now Patent No. 2,920,891, granted January 12, 1960, for Bowling Pin Setting Machine. The invention relates to an arrangement of belt conveyors in the pit of a bowling alley for the purpose of transferring the pins and balls which fall into the pit to the foot of an elevator at a rear corner of the pit so that the elevator can pick them up and deliver the balls to a ball-return and the pins to apparatus for grouping them and depositing the group in proper array on the pin-spot portion of the alley.

For a more complete understanding of the invention reference may be had to the following description thereof and to the drawing, of which:

Figure 1 is a plan view of an embodiment of the invention, parts being broken away to show details of structure, and Figure 2 is a perspective view of a deflector board which goes with the apparatus shown in Figure 1.

The rear end portion of the surface of a bowling alley 10 is shown in Figure 1. Also indicated are belt conveyors 16 in the gutters at each side of the pin-spot portion of the alley. When a pin is knocked by a glancing blow into one of the gutters, it is promptly discharged into the pit.

The belts 16 pass over rolls 18 mounted on a shaft 20 which also carries two rolls 22 and 24 supporting the forward loops of two conveyor belts having top reaches 25 and 26 extending along one side margin of the pit. The roll 24 is secured on a sleeve 27 which is on the shaft 20 but revolves in the opposite direction, so that the belt 26 is driven toward the front. Disposed transversely of the pit is a broad belt having an upper reach 28 which is driven toward the belt 26. A deflector board 29 is at the forward edge of the belt 28 and crosses over the belts 26 and 25, the board being indicated in Figure 1 by broken lines. A second deflector board 30 cooperates with the board 29 to keep the balls and pins on the belt 28 from leaving the belt until they are delivered to the belt 26. The narrowed portion 29′ toward the right causes pins on the belt 26 to be deflected over to the belt 25. The belt 25 is narrower than the body of a pin so that the pins thereon necessarily are in single file. This prevents congestion of pins at the foot of the elevator 14, the pins thus being delivered to the elevator one at a time.

For driving the several belts in the directions described, the shaft 20 and sleeve 27 have miter gears 40 and 42, respectively, which mesh with a miter gear 44 mounted on a shaft 46. Also mounted on the shaft 46 are a pinion 48, a sprocket wheel 50 and another miter gear 52. The pinion 48 meshes with a pinion 54 on a shaft 56 which drives the conveyor belt 28. The miter gear 52 meshes with another miter gear 60 mounted on a shaft 58 which drives the belt 25. The sprocket wheel 50 is connected by a chain 62 to the mechanism of the elevator 14 which in turn is driven by a motor (not shown).

I claim:

1. In combination, a bowling alley having a pin receiving pit at its far end and a pin receiving and elevating mechanism adjacent to one far corner of the pit; an endless conveyor approximately as wide as a bowling pin having a horizontal top reach disposed parallel with the alley along one margin of the pit to the elevating mechanism, a second conveyor having a horizontal top reach alongside the first said conveyor and running in the opposite direction, an endless conveyor having a horizontal top reach extending transversely of the alley from the other margin of the pit to said second conveyor, and driving connections for driving the conveyors to move the first named reach toward the elevating mechanism, the second named reach in the opposite direction, the third named reach in a direction toward the second named reach.

2. Mechanism as described in claim 1, said driving connections including means operatively connecting said conveyors with said elevating mechanism.

3. Mechanism as described in claim 1, said transverse conveyor having a deflector board extending along the side thereof adjacent to the alley, said board having a tapered end portion extending across the forward portion of the second said conveyor and presenting a face thereto at an angle to deflect objects on said second conveyor engaging said face to the first mentioned conveyor.

References Cited in the file of this patent

UNITED STATES PATENTS

| | | |
|---|---|---|
| 1,445,797 | Peirce | Feb. 20, 1923 |
| 1,479,866 | Moores | Jan. 8, 1924 |
| 2,003,097 | Vickery | May 28, 1935 |
| 2,353,638 | Beaulieu et al. | July 18, 1944 |
| 2,626,802 | Simpson | Jan. 27, 1953 |